United States Patent
Wang

(10) Patent No.: US 10,320,805 B2
(45) Date of Patent: Jun. 11, 2019

(54) VISITOR AUTHORIZATION MANAGEMENT METHOD AND APPARATUS, TERMINAL, SERVER, AND STORAGE MEDIUM

(71) Applicant: Ping An Technology (Shenzhen) Co., LTD., Shenzhen (CN)

(72) Inventor: Xiangzhang Wang, Shenzhen (CN)

(73) Assignee: Ping An Technology (Shenzhen) Co., LTD., Shenzhen (CN)

( * ) Notice: Subject to any disclaimer, the term of this patent is extended or adjusted under 35 U.S.C. 154(b) by 0 days.

(21) Appl. No.: 15/828,332

(22) Filed: Nov. 30, 2017

(65) Prior Publication Data

US 2018/0227312 A1     Aug. 9, 2018

Related U.S. Application Data

(63) Continuation of application No. PCT/CN2017/077319, filed on Mar. 20, 2017.

(30) Foreign Application Priority Data

Apr. 26, 2016   (CN) .......................... 2016 1 0264348

(51) Int. Cl.
*H04L 29/06* (2006.01)
*H04L 29/08* (2006.01)
*G07C 9/00* (2006.01)

(52) U.S. Cl.
CPC ........ *H04L 63/108* (2013.01); *G07C 9/00007* (2013.01); *H04L 67/10* (2013.01); *H04L 67/2842* (2013.01); *G07C 9/00* (2013.01); *G07C 2009/00865* (2013.01); *G07C 2209/08* (2013.01)

(58) Field of Classification Search
CPC ....... H04L 63/108; H04L 29/06; H04L 67/10; H04L 67/2842
See application file for complete search history.

(56) References Cited

U.S. PATENT DOCUMENTS 6,618,810 B1 *   9/2003   Dirie ..................... G06F 21/575
                                                        713/155
7,430,306 B1     9/2008   Obsorn et al.
(Continued)

FOREIGN PATENT DOCUMENTS

CN     101316182 A    12/2009
CN     103248920 A     8/2013
(Continued)

OTHER PUBLICATIONS

Durga et al. Assuring correctness for securing outsourced data repository in cloud environment, May 2014, IEEE International Conference on Advanced Communications, Control and Computing Technologies, pp. 1745-1748 (Year: 2014).*

(Continued)

*Primary Examiner* — Kenneth W Chang
(74) *Attorney, Agent, or Firm* — Rimon Law Firm

(57) ABSTRACT

A visitor authorization management method is provided. In the method, an authorization object identifier and an authorization operation information corresponding to the authorization object identifier are obtained. The authorization operation information according to the authorization object identifier is cached. A current latest authorization operation information corresponding to the authorization object identifier is retrieved from the cache. A reference time is determined based on an authorization time in the current latest authorization operation information. When a preset time period having the reference time as an end is reached, an authorization operation is performed according to the current latest authorization operation information and the authorization object identifier.

10 Claims, 8 Drawing Sheets

(56) References Cited

U.S. PATENT DOCUMENTS

| | | | |
|---|---|---|---|
| 2007/0083915 A1* | 4/2007 | Janakiraman | G06F 21/316 726/4 |
| 2007/0220589 A1* | 9/2007 | Salowey | H04L 63/08 726/2 |
| 2013/0043973 A1* | 2/2013 | Greisen | G07C 9/00571 340/5.51 |
| 2014/0007208 A1* | 1/2014 | Faludi | G06F 21/00 726/7 |
| 2014/0197921 A1 | 7/2014 | Menzel | |
| 2015/0220722 A1 | 8/2015 | Davis et al. | |
| 2015/0287256 A1 | 10/2015 | Davis | |

FOREIGN PATENT DOCUMENTS

| | | |
|---|---|---|
| CN | 103401868 A | 11/2013 |
| CN | 103679884 A | 3/2014 |
| CN | 105118186 A | 12/2015 |
| CN | 105376203 A | 3/2016 |
| CN | 105472037 A | 4/2016 |
| EP | 2434461 A1 | 3/2012 |
| JP | 10127865 A | 5/1998 |
| WO | 2015001019 A1 | 1/2015 |

OTHER PUBLICATIONS

Japanese Office Action for Application No. 2017-561736 dated May 28, 2018.
Australian Office Action for Application No. 2017255367, dated Jul. 4, 2018.
State Intellectual Property Office of the People's Republic of China, Written Opinion for International Application No. PCT/CN2017/077319 dated Jun. 23, 2017 (partial English translation attached).
European Search Report for European Application No. 177885571.1-1213/3352430 PCT/CN2017077319, dated Dec. 7, 2018.

* cited by examiner

VISITOR AUTHORIZATION MANAGEMENT METHOD AND APPARATUS, TERMINAL, SERVER, AND STORAGE MEDIUM

CROSS-REFERENCE TO RELATED APPLICATION

This application is a continuation under 35 U.S.C. § 120 of international patent application PCT/CN2017/077319 that was filed on Mar. 20, 2017, and claims priority to Chinese Patent Application No. 201610264348 filed on Apr. 26, 2016 in the State Intellectual Property Office of China and entitled "VISITOR AUTHORIZATION MANAGEMENT METHOD AND APPARATUS," the content of which are hereby incorporated by reference in their entirety.

FIELD OF THE TECHNOLOGY

The present application relates to the field of computer technology, and particularly to visitor authorization management methods and apparatus, terminals, servers, and storage mediums.

BACKGROUND

With an improvement in function of a visitor system, the owner can input visitor information (such as the visitor's license number or mobile phone number) through an access authorization page at a terminal. The terminal generates an authorization operation request, and sends the authorization operation request to a server through a network. The server performs an authorization operation corresponding to the authorization operation request allowing the owner to authorize the visitor's access. So that when the visitor comes, an access control system or a barrier system will automatically identify and automatically release the authorized visitor.

In reality, the owner may repeatedly authorize the same visitor in a certain period of time, usually due to repeated changes of the visitor's time schedule, the owner's time schedule, etc. The owner may add, delete, add again, and modify the visitor's authorization information in a period of time.

In a conventional method, every authorization operation request corresponding to the visitor is sent from the terminal to the server through the network. The server needs to repeatedly and correspondingly perform the authorization operations. Obviously, repeating the authorization operations for the same visitor in a certain period of time will cost a great amount of resources.

SUMMARY

According to various embodiments disclosed in the present application, a visitor authorization management method and apparatus, a terminal, a server, and a storage medium are provided.

A visitor authorization management method, including:
obtaining an authorization object identifier and an authorization operation information corresponding to the authorization object identifier, and correspondingly caching the authorization operation information according to the authorization object identifier;
retrieving a current latest authorization operation information corresponding to the authorization object identifier from a cache, and determining a reference time based on an authorization time in the current latest authorization operation information; and
when a preset time period having the reference time as an end is reached, performing an authorization operation according to the current latest authorization operation information and the authorization object identifier.

A visitor authorization management apparatus, including:
a cache module configured to obtain an authorization object identifier and an authorization operation information corresponding to the authorization object identifier, and correspondingly cache the authorization operation information according to the authorization object identifier;
a reference time determination module configured to retrieve a current latest authorization operation information corresponding to the authorization object identifier from the cache and determining a reference time based on an authorization time in the current latest authorization operation information; and
an authorization processing module configured to perform an authorization operation according to the current latest authorization operation information and the authorization object identifier when a preset time period having the reference time as an end is reached.

A terminal including a memory and a processor, the memory storing instructions, when the instructions are executed by the processor, the processor performs steps of:
obtaining an authorization object identifier and an authorization operation information corresponding to the authorization object identifier, and correspondingly caching the authorization operation information according to the authorization object identifier;
retrieving a current latest authorization operation information corresponding to the authorization object identifier from a cache, and determining a reference time based on an authorization time in the current latest authorization operation information; and
when a preset time period having the reference time as an end is reached, performing an authorization operation according to the current latest authorization operation information and the authorization object identifier.

A server including a memory and a processor, the memory storing instructions, when the instructions are executed by the processor, the processor performs steps of:
obtaining an authorization object identifier and an authorization operation information corresponding to the authorization object identifier, and correspondingly caching the authorization operation information according to the authorization object identifier;
retrieving a current latest authorization operation information corresponding to the authorization object identifier from a cache, and determining a reference time based on an authorization time in the current latest authorization operation information; and
when a preset time period having the reference time as an end is reached, performing an authorization operation according to the current latest authorization operation information and the authorization object identifier.

One or more non-volatile readable storage medium storing computer-executable instructions, when the computer-executable instructions are executed by one or more processors, the one or more processors performs steps of:
obtaining an authorization object identifier and an authorization operation information corresponding to the authorization object identifier, and correspondingly caching the authorization operation information according to the authorization object identifier;
retrieving a current latest authorization operation information corresponding to the authorization object identifier from a cache, and determining a reference time based on an authorization time in the current latest authorization operation information; and when a preset time period having the reference time as an end is reached, performing an authorization operation according to the current latest authorization operation information and the authorization object identifier.

The details of one or more embodiments of the present application are set forth in the accompanying drawings and the detailed description below. Other features, objects, and advantages of the present application will become apparent from the detailed description, the drawings, and the claims.

BRIEF DESCRIPTION OF THE DRAWINGS

In order to provide a clearer description of the embodiments of the present application, the following drawings, which are to be used in the description of the embodiments, are briefly described. The drawings only shows a number of embodiments of the present application, and other drawings can be obtained by those skilled in the art without doing an inventive work.

DETAILED DESCRIPTION

The present application will now be described in detail with reference to the accompanying drawings and embodiments in order to make the objects, technical solutions, and advantages of the present application more clear. The embodiments described herein are for the purpose of explaining the application and are not intended to limit the application.

Figure 1:
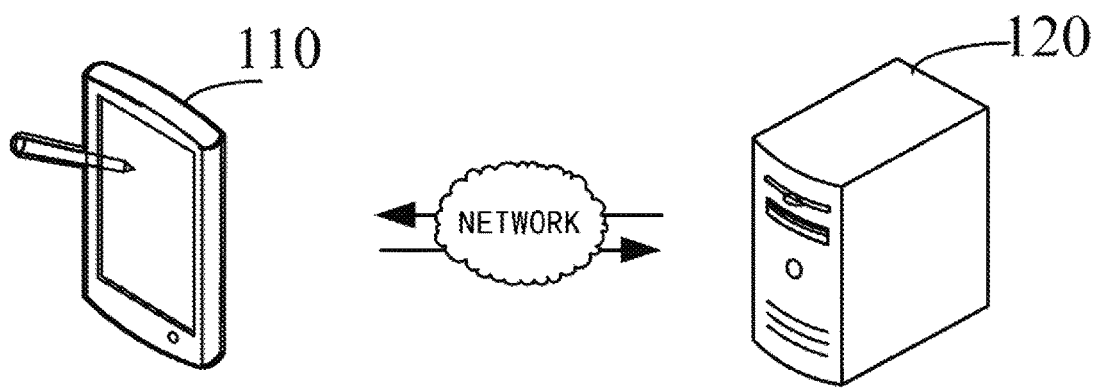
FIG. 1 is an application scenario diagram of one embodiment of a visitor authorization management method.

FIG. 1 is an application scenario diagram of one embodiment of a visitor authorization management method. Referring to FIG. 1, the terminal 110 communicates with the server 120 through a network.

In one embodiment of the application scenario shown in FIG. 1, it can be the terminal 110 that obtains an authorization object identifier and a corresponding authorization operation information, and caches the authorization operation information according to the authorization object identifier. The terminal 110 retrieves a current latest authorization operation information corresponding to the authorization object identifier from the cache, and determines the reference time based on the authorization time in the current latest authorization operation information. When a preset time period having the reference time as an end is reached, the terminal 110 generates an authorization operation request based on the current latest authorization operation information and the authorization object identifier, and sends the authorization operation request to the server 120 so that the server 120 performs a corresponding authorization operation according to the authorization operation request.

In another embodiment, the terminal 110 can send the authorization operation request to the server 120. The server 120 obtains the authorization object identifier and the corresponding authorization operation information included in the authorization operation request, and correspondingly caching the authorization operation information according to the authorization object identifier. The server 120 retrieves the current latest authorization operation information corresponding to the authorization object identifier from the cache, and determines the reference time based on the authorization time in the current latest authorization operation information. When the preset time period having the reference time as the end of the preset time period is reached, the server 120 performs the corresponding authorization operation according to the current latest authorization operation information and the authorization object identifier.

Figure 2:
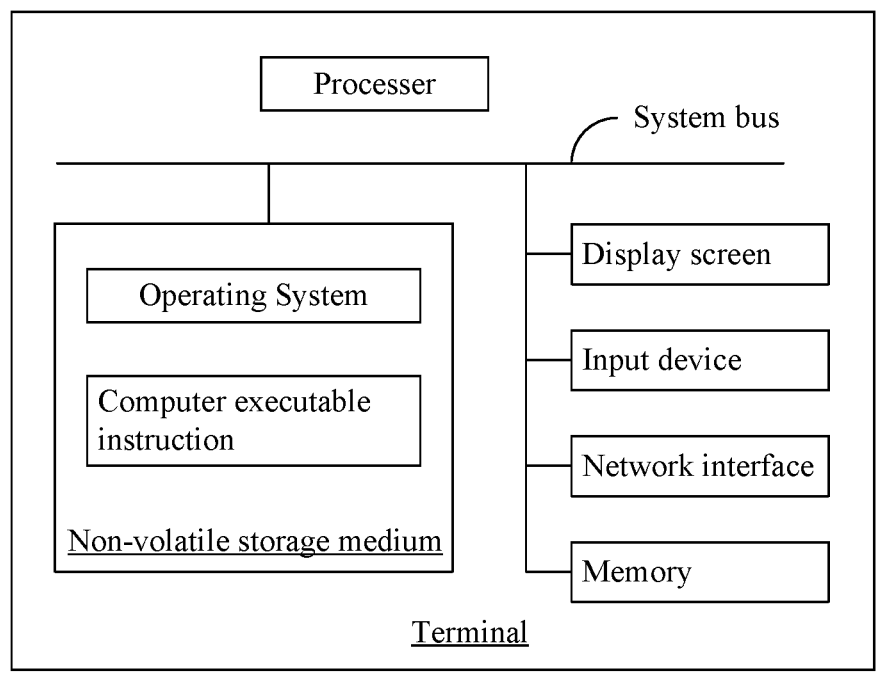
FIG. 2 is a block diagram of one embodiment of a terminal.

In one embodiment, a terminal is provided on which an application can be installed. The terminal can be a mobile phone, a tablet, a laptop computer, a desktop computer and so on. Referring to FIG. 2, the terminal can include a processor, a memory, a non-volatile storage medium, a network interface, a display screen, and an input device, which are connected through a system bus. The processor is configured to provide computing and controlling capabilities to support the operation of the entire terminal. The non-volatile storage medium of the terminal stores an operating system and computer executable instructions. The computer executable instructions are capable of being executed by the processor to implement a visitor authorization management method provided by the following embodiments. The memory in the terminal provides an operating environment for the operating system and the computer executable instructions in the non-volatile storage medium. The network interface is configured to be connected to the network for communication. The display screen of the terminal can be such as a liquid crystal display screen or an electronic ink display screen. In the present embodiment, the display screen can be used as an output device of the terminal for displaying various interfaces such as an authorization operation interface. The input device can be a touch panel covered on the display screen; a button, a trackball, or a touchpad provided on a housing of an electronic device; or an external keyboard, a touchpad, or a mouse. The input device is configured to allow the user to input various operating instructions. For example, in the present embodiment, the user can input an authorization operation instruction through the input device.

It can be understood that FIG. 2 is a block diagram simply showing the parts in the terminal that are related to the present application, and does not constitute a limitation on the terminal which the present application can be applied to. The specific terminal can include more or fewer parts compared with that shown in the drawings, or can be in combination with certain parts, or can have different parts.

Figure 3:
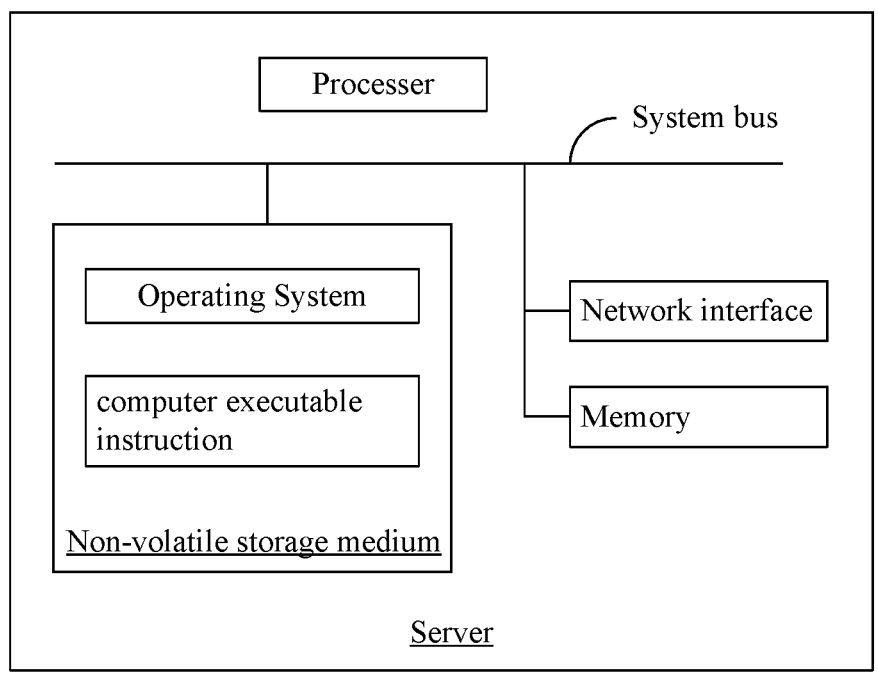
FIG. 3 is a block diagram of one embodiment of a server.

In one embodiment, a server is provided. Referring to FIG. 3, the server can include a processor, a non-volatile storage medium, a memory, and a network interface, which are connected through the system bus. The processor is configured to provide computing and controlling capabilities to support the operation of the entire server. The non-volatile storage medium of the server stores an operating system and computer executable instructions. The computer executable instructions are capable of being executed by the processor to implement a visitor authorization management method applicable to the server provided by the following embodiments. The memory in the server provides an operating environment for the operating system and the computer executable instructions in the non-volatile storage medium. The network interface is configured to be connected to the network for communication. For example, in the present embodiment, the server can obtain an authorization operation request from the terminal through the network interface. It can be understood that the server can be a standalone server or a server cluster having multiple servers.

It can be understood that FIG. 3 is a block diagram simply showing the parts in the server that are related to the present application, and does not constitute a limitation on the server which the present application can be applied to. The specific server can include more or fewer parts compared with that shown in the drawings, or can be in combination with certain parts, or can have different parts.

Figure 4:
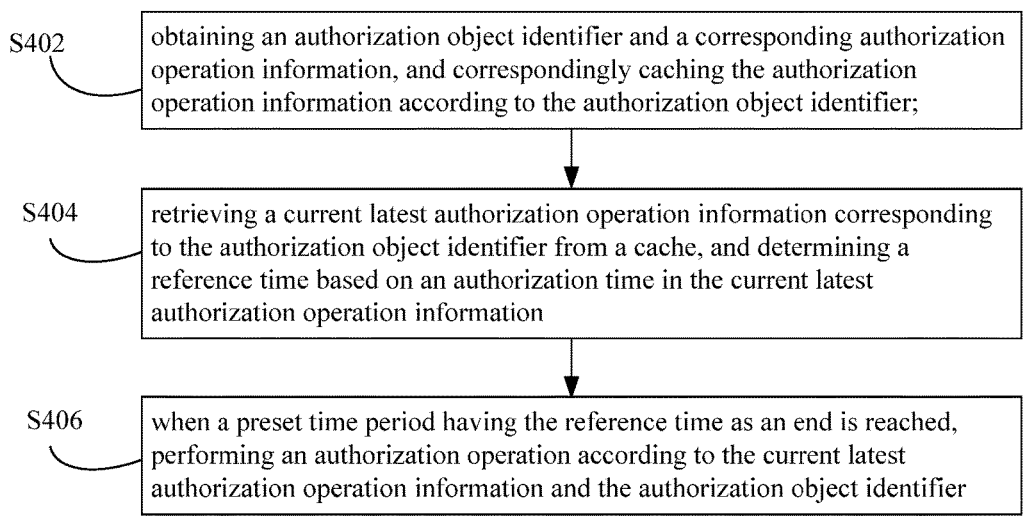
FIG. 4 is a flow chart of one embodiment of the visitor authorization management method.

Referring to FIG. 4, in one embodiment, a visitor authorization management method is exemplified by being applied to the terminal shown in FIG. 2 or the server shown in FIG. 3, and the method includes the following steps:

Step S402, obtaining an authorization object identifier and a corresponding authorization operation information, and correspondingly caching the authorization operation information according to the authorization object identifier; Step S404, retrieving a current latest authorization operation information corresponding to the authorization object identifier from a cache, and determining a reference time based on an authorization time in the current latest authorization operation information; and Step S406, when a preset time period having the reference time as an end is reached, performing an authorization operation according to the current latest authorization operation information and the authorization object identifier.

It can be understood that the step S402 can be performed at the terminal or at the server.

If the step S402 is performed at the terminal, the terminal receives the authorization operation instruction and obtains the corresponding authorization object identifier and authorization operation information according to the authorization operation instruction. Specifically, the user (such as the owner) inputs an authorization operation instruction through the input device of the terminal. In one embodiment, the user inputs or selects an authorization object through an authorization operation interface displayed by the terminal, and further performs an operation for the authorization object. The terminal receives the authorization operation instruction and obtains the authorization object identifier and the authorization operation information corresponding to the authorization operation instruction. The authorization operation instruction can be an instruction for creating of authorization, updating of authorization information, or canceling of authorization.

If the step S402 is performed at the server, the server receives the authorization operation request sent by the terminal, and obtains the authorization object identifier and the corresponding authorization operation information carried in the authorization operation request. Specifically, the terminal responds to the user's operation, generates an authorization operation request, and sends the authorization operation request to the server. The server receives the authorization operation request sent from the terminal, obtains the authorization object identifier and the corresponding authorization operation information carried in the authorization operation request. The authorization operation request can be a request for creating of authorization, updating of authorization information, or canceling of authorization.

The authorization object identifier refers to an identification information capable of being used to identify the authorization object, and can be at least one of a license plate number, a mobile phone number, a resident identity card number, and the like.

The authorization operation information includes the authorization information to be processed, such as the authorization information to be created, the authorization information that is updated, the authorization information to be canceled, and so on.

Further, the correspondingly caching the authorization operation information according to the authorization object identifier is caching the authorization operation information and creating a correspondence between the authorization object identifier and the authorization operation information.

In step S404, specifically, the authorization operation information contains the authorization time. As described in step S402, the authorization operation information includes the authorization information to be processed, and the authorization information to be processed includes the authorization time. The authorization time refers to the time at which the authorization object has an access permission, that is, the authorization object has the right to access if the authorization time is satisfied, such as can freely access the barrier system.

In one embodiment, the authorization time can be a point in time, e.g., the authorization initial time. The authorization initial time refers to the point in time at which the authorization object begins to have the access permission, such as a certain date, a certain time, a certain minute and so on. The authorization object can be in the authorized state after the authorization time. For example, the authorization time for the authorization object A input by the owner is 08:00 on Mar. 15, 2016, then the authorization object A is in the authorized state from 8:00 on Mar. 15, 2016, and can freely access.

Further, it can be understood that the authorization operation corresponding to the point-in-time type authorization time can be a permanent authorization that the visitor can have a permanent access permission from the authorization time. In another embodiment, a termination time can be defined by a predetermined period of time from the authorization time, wherein the termination time is the time from which the authorization object's authorization, e.g., the access permission, terminates. The predetermined period of time can be a period of natural days, such as every day, every week, or every month. The predetermined period of time can be counted from the point-in-time type authorization time. In another embodiment, the authorization can terminate according to a preset rule, such as when a number of accesses of the visitor reaches a preset value, the authorization is automatically terminated, and an automatic terminate operation is performed for the authorization object identifier.

In another embodiment, the authorization time can also be an authorized time period in which the authorization object is in the authorized state. For example, the authorization time for the authorization object A input by the owner is from 08:00 on Mar. 15, 2016 to 12:00 on Mar. 15, 2016, then the authorization object A is in the authorized state from 08:00 on Mar. 15, 2016 to 12:00 on Mar. 15, 2016, and can freely access in this time period. It can be understood that when the authorization time is a time period, the authorization time includes the authorization initial time and the authorization termination time. In combination with the above description, the authorization initial time is the time at which the authorization object starts to have the permission, and the authorization termination time is the time from which the permission terminates. For example, 9:00 to 12:00 is input by the owner as the authorization time for the authorization object A, then 9:00 is the authorization initial time, 12:00 is the authorization termination time.

Further, the current latest authorization operation information corresponding to the authorization object identifier can be obtained from the cache in step S402. The current latest authorization operation information is the most recent authorization operation information obtained at the time nearest to the current time corresponding to the authorization object identifier in the cache.

Furthermore, the reference time can be determined based on the authorization time in the current latest authorization operation information. The reference time refers to the time as a reference for determining the time for generating the authorization operation request, e.g., the reference time is configured to determine when the authorization operation request is to be generated.

In one embodiment, the authorization time in the current latest authorization operation information can be used as the reference time. In another embodiment, the reference time can be determined based on a comparison result between the authorization time in the current latest authorization operation information and a valid-state authorization time. In one embodiment, the reference time can be the authorization initial time either of the authorization time in the current latest authorization operation information or of the valid-state authorization time. In another embodiment, the reference time can be the authorization termination time either of the authorization time in the current latest authorization operation information or of the valid-state authorization time. The choosing between the authorization initial time and the authorization termination time as the reference time can be decided by an actual situation.

The valid-state authorization time refers to the authorization time included in a valid-state authorization information corresponding to the authorization object identifier. The valid-state authorization information refers to the authorization information labeled with a success authorization flag and has not expired.

It can be understood that the above steps can be performed at the terminal or at the server. If the steps are performed at the terminal, the success authorization flag is the flag labeled to the successfully authorized authorization operation information by the terminal, after the server has successfully authorized the authorization information, and after an authorization success notification is sent back to the terminal. If the steps are performed at the server, the success authorization flag is the flag to the successfully authorized authorization operation information labeled by the server, after the server has successfully authorized the authorization information.

It can be understood that the successful authorization of the authorization information is the operation of completing the authorization to the authorization object, thereby the authorization object has the authority. The valid-state authorization time does not mean that the current time has to reach the authorization time. As long as the server successfully authorizes the authorization time, and the authorization time has not expired, the authorization time is a valid-state authorization time. For example, the current time is 8:00, the server has completed the authorization for the time period 9:00 to 12:00 to the visitor, and the authorization of the time period 9:00 to 12:00 has not expired, the time period 9:00 to 12:00 is the valid-state authorization time.

It can be understood that the step S406 can be performed at the terminal or at the server.

If the step S406 is performed at the terminal, the preset time period is set in the terminal, and the step S406 includes: the terminal generates the authorization operation request according to the current latest authorization operation information and the authorization object identifier, and sends the authorization operation request to the server. Further, the server can obtain the current latest authorization operation information and the authorization object identifier carried in the authorization operation request, and can perform the corresponding authorization operation to the authorization object identifier according to the current latest authorization operation information. In one embodiment, the method can further include: the terminal receiving an authorization success notification for the authorization operation information sent back by the server, and labeling the success authorization flag to the successfully authorized authorization operation information.

If the step S406 is performed at the server, the preset time period is set in the server, and the step S406 includes: the server performing the corresponding authorization operation to the authorization object identifier according to the current latest authorization operation information. Further, the server can label the success authorization flag to the successfully authorized authorization operation information. Further, the server can send the authorization success notification back to the terminal.

It can be understood that reaching the preset time period, which has the reference time as the end, means that the current time reaches and/or passes the beginning of the preset time period. For example, the reference time is 9:00, the preset time period is 10 minutes, then any time from 8:50 to a later point in time reaches the preset time period. So if the current latest authorization operation information is obtained at 10:00, 10:00 is after 8:50, then 10:00 reaches the preset time period, and it is necessary to perform the corresponding authorization operation according to the current latest authorization operation information and the authorization object identifier.

Further, the preset time period can be modified. Specifically, the software provider can change the preset time period through a software update. In some embodiments, different preset time periods can be set for different users.

The terminal or the server repeats the above-described steps S402 and S404 when the user at least once sends the authorization operation instruction for the same authorization object identifier before the current time reaches the preset time period. The terminal or the server caches the authorization operation information corresponding to every new authorization operation instruction, updates the current latest authorization operation information, and re-determines the reference time based on the authorization time in the current latest authorization operation information.

Further, the server obtains the current latest authorization operation information and the authorization object identifier carried in the authorization operation request, and performs the corresponding authorization operation to the authorization object identifier according to the current latest authorization operation information.

In the present embodiment, the corresponding authorization operation information can be cached according to the authorization object identifier, after obtaining an authorization object identifier and a corresponding authorization operation information. The reference time is determined based on the authorization time in the current latest authorization operation information. When the time reaches the preset time period, the corresponding authorization operation is performed. It is not necessary to perform the corresponding authorization operation every time an authorization operation information is obtained, thereby saving the resources.

Further, when the method is applied to the terminal, the terminal does not need to send an authorization operation request to the server every time an authorization operation instruction is received, thereby avoiding a waste of network resources caused by the repeated authorization operations by the user and the repeated authorization operation requests sent to the server in a certain period of time. In addition, it is conceivable that the server also avoids redundant authorization operations based on the authorization operation requests repeatedly sent from the terminal, thereby saving the server resources.

Further, in the present embodiment, the reference time is determined based on the authorization time in the current latest authorization operation information, and the timing of the corresponding authorization operation is determined based on the reference time. Accordingly, not only the network resource and/or the server resource are saved (hereinafter saving the resources), but also the final authorization operation of the user can be performed successfully.

In one embodiment, the step of determining the reference time based on the authorization time in the current latest authorization operation information includes: detecting whether the authorization object identifier has a corresponding valid-state authorization time; and adopting the authorization time in the current latest authorization operation information as the reference time when the authorization object identifier does not have the corresponding valid-state authorization time.

In the present embodiment, during the determining of the reference time, whether or not the authorization object identifier has a corresponding valid-state authorization time is detected. As described above, the valid-state authorization time is the authorization time included in the authorization information corresponding to the authorization object identifier, and the authorization information has a success authorization flag and has not expired.

When no corresponding valid-state authorization time is detected, the authorization time in the current latest authorization operation information is adopted as the reference time. It can be understood that the authorization object identifier does not have a corresponding valid-state authorization time means that the authorization object currently does not have any authorization to freely access.

Further, the authorization initial time in the current latest authorization operation information can be adopted as the reference time. When the authorization time in the current latest authorization operation information is the point-in-time type, the authorization time is equivalent to the authorization initial time.

It can be understood that the above-described steps can be executed at the terminal or at the server.

In the present embodiment, the reference time is determined based on whether or not there is a valid-state authorization time. When the authorization object identifier does not have a corresponding valid-state authorization time, the authorization time in the current latest authorization operation information is adopted as the reference time, so that the reference time is more accurate.

Figure 5:
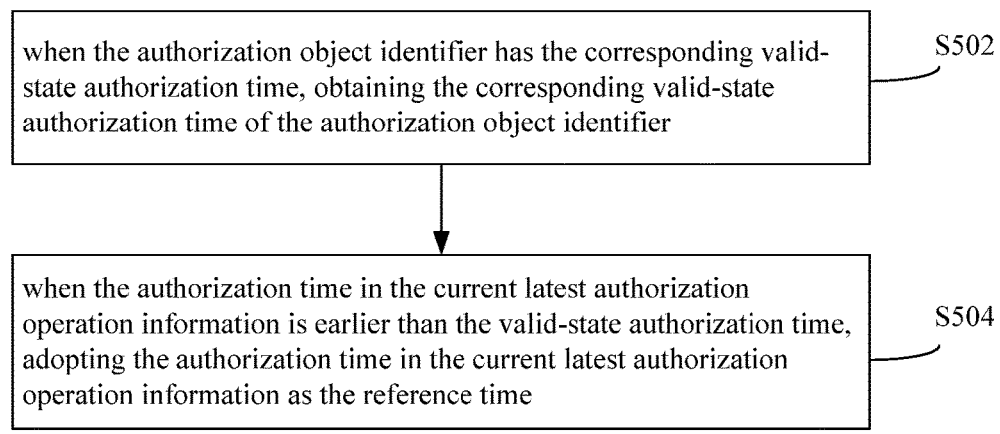
FIG. 5 is a flow chart of one embodiment of a method for determining a reference time.

Referring to FIG. 5, in one embodiment, after the step of detecting whether the authorization object identifier has a corresponding valid-state authorization time, the method further includes a step of determining the reference time, which further include:

Step S502, when the authorization object identifier has the corresponding valid-state authorization time, obtaining the corresponding valid-state authorization time of the authorization object identifier; and Step S504, when the authorization time in the current latest authorization operation information is earlier than the valid-state authorization time, adopting the authorization time in the current latest authorization operation information as the reference time.

In the present embodiment, when the corresponding valid-state authorization time of the authorization object identifier is detected, the valid-state authorization time corresponding to the authorization object identifier is further obtained. It can be understood that the authorization object identifier has the corresponding valid-state authorization time means that the authorization object is currently authorized for a certain period of time, and the authorization object is free to access in the valid-state authorization time.

Further, the authorization time in the current latest authorization operation information is compared with the valid-state authorization time, and the reference time is determined based on the comparison result.

Specifically, when the authorization time in the current latest authorization operation information is earlier than the valid-state authorization time, the authorization time in the current latest authorization operation information is adopted as the reference time.

For example, if the authorization time in the current latest authorization operation information is 9:00 and the valid-state authorization time is 10:00, the authorization operation has to be performed before the authorization time, 9:00, required by the user. Then, it is necessary to use 9:00 as the reference time, that is, the authorization time in the current latest authorization operation information is adopted as the reference time.

In one embodiment, whether the authorization termination time is earlier than the valid-state authorization termination time is determined when the authorization time has a change only for the authorization termination time in the current latest authorization operation information with respect to the valid-state authorization time, and the authorization initial time is unchanged. If the authorization termination time is earlier than the valid-state authorization termination time, the authorization termination time in the current latest authorization operation information is adopted as the reference time.

The authorization termination time in the current latest authorization operation information is also earlier than the valid-state authorization termination time when the authorization termination time in the current latest authorization operation information is a specific point in time, and the valid-state authorization termination time is undefined. For example, the authorization time in the current latest authorization operation information is 9:00 to 11:00, and the valid-state authorization time is 9:00 to 12:00, then the reference time is the authorization termination time (e.g., 11:00) in the current latest authorization operation information.

In another embodiment, whether the authorization initial time in the current latest authorization operation information is early than the valid-state authorization initial time is determined when the authorization initial time of the authorization time in the current latest authorization operation information is changed with respect to the valid-state authorization time. If the authorization initial time in the current latest authorization operation information is early than the valid-state authorization initial time, the reference time is the authorization initial time in the current latest authorization operation information.

It can be understood that, in this case, regardless of whether or not the authorization termination time in the current latest authorization operation information is changed with respect to the valid-state authorization termination time, as long as the authorization initial time in the current latest authorization operation information is changed, the reference time is the one in the two authorization initial times. For example, the authorization time in the current latest authorization operation information is 9:00 to 11:00, and the valid-state authorization time is 10:00 to 12:00. The reference time is the authorization initial time in the current latest authorization operation information (e.g., 9:00).

Further, as described above, when the authorization time is a point in time, this point in time represents the authorization initial time. Therefore, if the authorization time in the current latest authorization operation information or the valid-state authorization time is a point in time, both of them have the authorization initial time.

It can be understood that the above-described step can be performed at the terminal or at the server.

In the present embodiment, when the authorization object identifier has a corresponding valid-state authorization time, the authorization time in the current latest authorization operation information and the valid-state authorization time are compared. When the authorization time in the current latest authorization operation information is earlier than the valid-state authorization time, the reference time is the authorization time in the current latest authorization operation information so that the determined reference time is more accurate.

In addition, the multi-angle and multi-aspect comparison, which further improves the accuracy of the reference time, can be achieved by respectively adopting the authorization initial time or the authorization termination time of the authorization time in the current latest authorization operation information in conjunction with the relative change between the authorization time in the current latest authorization operation information and the valid-state authorization time. Thereby, not only the resources can be saved, but also the user's successful authorization operation can be guaranteed.

In one embodiment, the method further includes: adopting the valid-state authorization time as the reference time when the authorization time in the current latest authorization operation information is later than the valid-state authorization time.

For example, if the authorization time in the current latest authorization operation information is 10:00 and the valid-state authorization time is 9:00, it meant to give authorization to the authorization object at 9:00, and the user in fact now wants the authorization object to be authorized from 10:00. Therefore, it needs to adopt the valid-state authorization time (e.g., 9:00) as the reference time. When the preset time period having 9:00 as the end is reached, the authorization operation is performed according to the current latest authorization operation information which has the authorization time of 10:00. Besides the saving of the resources, the user's authorization operation can be timely implemented to improve the security.

Specifically, in one embodiment, when the authorization time has a change only for the authorization termination time in the current latest authorization operation information with respect to the valid-state authorization time, and the authorization initial time is unchanged, whether the authorization termination time in the current latest authorization operation information is earlier than the valid-state authorization termination time is determined. When the authorization termination time in the current latest authorization operation information is later than the valid-state authorization termination time, the valid-state authorization termination time is adopted as the reference time.

When the authorization termination time in the current latest authorization operation information is undefined, and the valid-state authorization termination time is a specific point in time, the undefined authorization termination time in the current latest authorization operation information is also later than the valid-state authorization termination time.

In another embodiment, whether the authorization initial time in the current latest authorization operation information is earlier than the valid-state authorization initial time is determined when the authorization initial time of the authorization time in the current latest authorization operation information is changed with respect to the valid-state authorization time. When the authorization time in the current latest authorization operation information is later than the valid-state authorization time, the valid-state authorization initial time is adopted as the reference time.

It can be understood that, in this situation, regardless of whether or not the authorization termination time in the current latest authorization operation information is changed with respect to the valid-state authorization termination time, as long as the authorization initial time in the current latest authorization operation information is changed, the reference time is the one in the two authorization initial times.

It can be understood that the above-described steps can be executed at the terminal or at the server.

In the present embodiment, when the authorization time in the current latest authorization operation information is later than the valid-state authorization time, the valid-state authorization time is adopted as the reference time so that the determined reference time is more accurate and the authorization can be updated timely to improve the security.

In addition, the multi-angle and multi-aspect comparison, which further improves the accuracy of the reference time, can be achieved by respectively adopting the authorization initial time or the authorization termination time of the valid-state authorization time in conjunction with the relative change between the authorization time in the current latest authorization operation information and the valid-state authorization time. Thereby, not only the resources can be saved, but also the user's successful authorization operation can be guaranteed.

Figure 6:
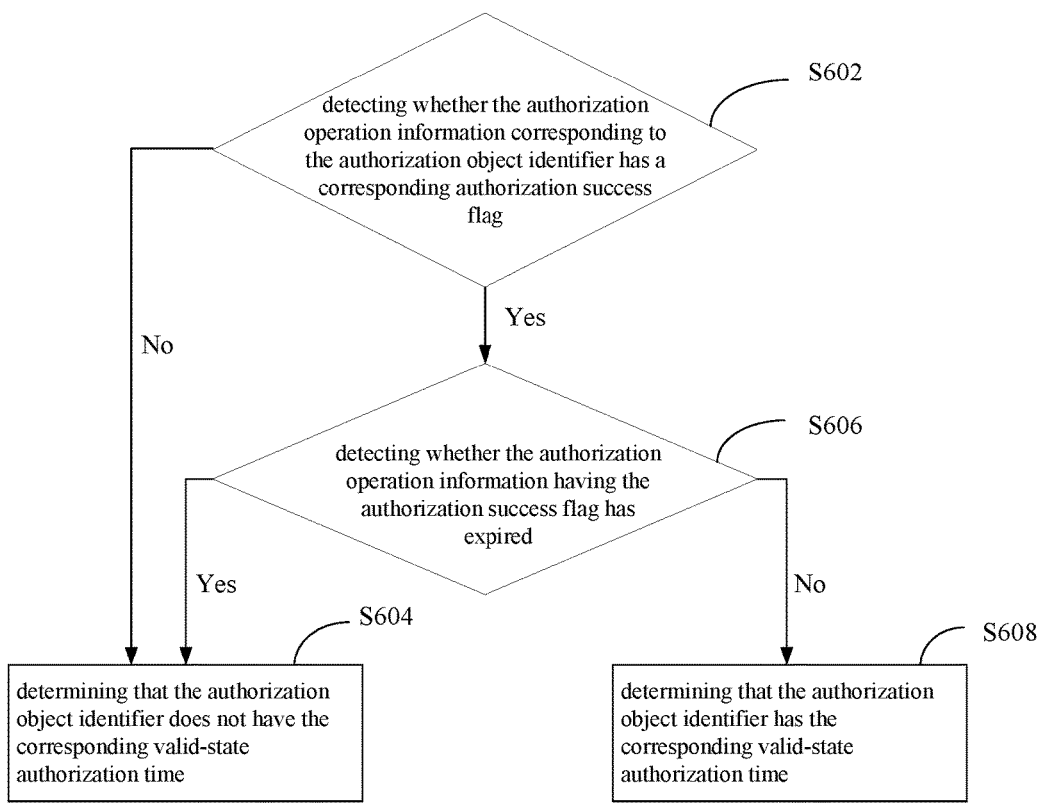
FIG. 6 is a flow chart of a method for detecting an valid-state authorization time.

Referring to FIG. 6, in one embodiment, the step of detecting whether the authorization object identifier has the corresponding valid-state authorization time (i.e., the valid-state authorization time detecting step) includes the following steps:

Step S602, detecting whether the authorization operation information corresponding to the authorization object identifier has a corresponding success authorization flag; performing step S604 if the answer is no; and performing step S606 if the answer is yes;

Step S604, determining that the authorization object identifier does not have the corresponding valid-state authorization time;

Step S606, detecting whether the authorization operation information having the success authorization flag has expired; performing step S604 if the answer is yes; and performing step S608 if the answer is no;

Step S608, determining that the authorization object identifier has the corresponding valid-state authorization time.

In the present embodiment, the correspondence relationship between the authorization object identifier and the authorization operation information is stored in advance. Whether the authorization operation information corresponding to the authorization object identifier has a corresponding success authorization flag is determined based on the correspondence relationship. If the authorization operation information does not have the success authorization flag, it indicates that the authorization operation information corresponding to the authorization object identifier is not authorized, then the authorization object identifier is determined as not having the corresponding valid-state authorization time.

When the authorization operation information corresponding to the authorization object identifier has the corresponding success authorization flag, whether the authorization operation information with the success authorization flag has expired is detected. If it has expired, then the authorization object identifier does not have the corresponding valid-state authorization time. If it has not expired, then the authorization object identifier has the corresponding valid-state authorization time.

Further, it is possible to determine whether the authorization operation information with the success authorization flag has expired by detecting whether the authorization time in the authorization operation information with the success authorization flag has expired. If the authorization time expires, the corresponding authorization operation information has expired, and vice versa.

It can be understood that the above described step can be performed at the terminal or at the server.

In the present embodiment, the valid-state authorization time is determined by the detecting of the success authorization flag and the detecting of the expiration. Through the multi-level determination, the valid-state authorization time screened out is more referable. Further, the reference time determined by combining the valid-state authorization time and the authorization time in the current latest authorization operation information is more accurate. Thus, the more resources are saved, and the user's final authorization operation is completed smoothly.

Figure 7:
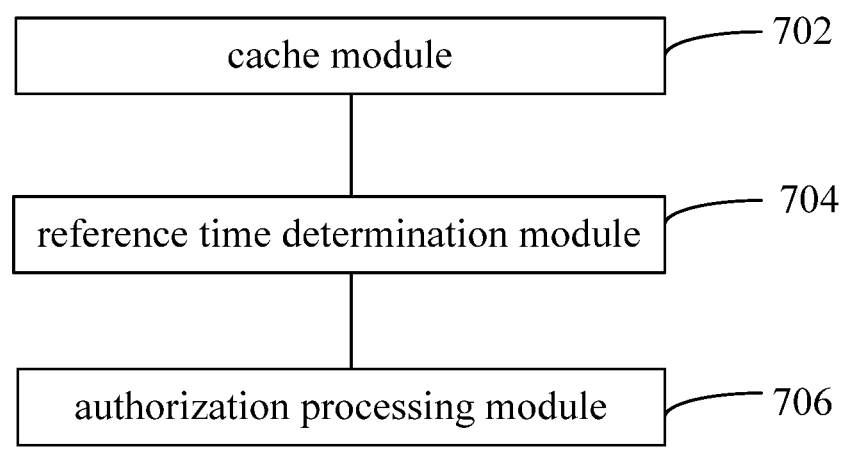
FIG. 7 is a block diagram of one embodiment of a visitor authorization management apparatus.

Referring to FIG. 7, in one embodiment, a visitor authorization management apparatus includes a cache module 702, a reference time determination module 704, and an authorization processing module 706, wherein:

the cache module 702 is configured to obtain an authorization object identifier and an authorization operation information corresponding to the authorization object identifier, and correspondingly cache the authorization operation information according to the authorization object identifier;

the reference time determination module 704 is configured to retrieve a current latest authorization operation information corresponding to the authorization object identifier from the cache and determining a reference time based on an authorization time in the current latest authorization operation information; and the authorization processing module 706 is configured to perform an authorization operation according to the current latest authorization operation information and the authorization object identifier when a preset time period having the reference time as an end is reached.

In one embodiment, the reference time determination module 704 is also configured to detect whether the authorization object identifier has a corresponding valid-state authorization time. When the authorization object identifier does not have a corresponding valid-state authorization time, the authorization time in the current latest authorization operation information is adopted as the reference time.

In one embodiment, the reference time determination module 704 is also configured to obtain the valid-state authorization time corresponding to the authorization object identifier when the authorization object identifier has the corresponding valid-state authorization time. When the authorization time in the current latest authorization operation information is earlier than the valid-state authorization time, the authorization time in the current latest authorization operation information is adopted as the reference time.

In one embodiment, the reference time determination module 704 is also configured to adopt the valid-state authorization time as the reference time when the authorization time in the current latest authorization operation information is later than the valid-state authorization time.

Figure 8:
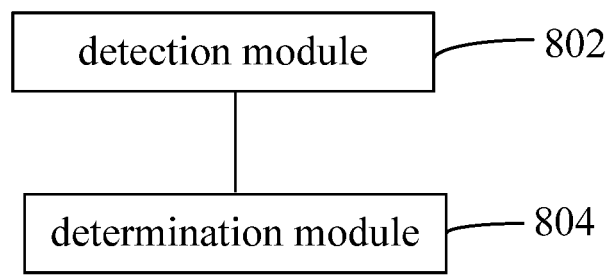
FIG. 8 is a block diagram of one embodiment of a reference time determination module.

Referring to FIG. 8, in one embodiment, the reference time determination module 704 includes:

a detection module 802 for detecting whether the authorization operation information corresponding to the authorization object identifier has the corresponding success authorization flag; and a determination module 804 for determining that the authorization object identifier does not have the corresponding valid-state authorization time when the detection module 802 detects no corresponding success authorization flag in the authorization operation information corresponding to the authorization object identifier.

The detection module 802 is also configured to detect whether the authorization operation information with the success authorization flag has expired when the success authorization flag in the authorization operation information corresponding to the authorization object identifier is detected.

The determination module 804 is also configured to determine that the authorization object identifier does not have the corresponding valid-state authorization time when the detection module 802 detects that the authorization operation information with the success authorization flag has expired. The determination module 804 is also configured to determine that the authorization object identifier has the corresponding valid-state authorization time when the detection module 802 detects that the authorization operation information with the success authorization flag has not expired.

Each of the modules in the visitor authorization management apparatus described above can be implemented as a whole or in part in software, hardware, and combinations thereof. For example, in the hardware implementation, the above-mentioned cache module 702 is configured to obtain the authorization object identifier and the corresponding authorization operation information from the terminal through the network interface of the server. The network interface can be an Ethernet adapter or a wireless network adapter. The modules can be in hardware form integrated in or independent from a processer of a base station, or in software form stored in the memory of the base station, so that the processor can call and execute the operations corresponding to the above-described modules. The processor can be a central processing unit (CPU), a microprocessor, or a microcontroller.

It should be noted that those skilled in the art will appreciate that all or part of the steps in the method according to the above embodiments may be implemented by related hardwares under instructions of a program, which is stored in a computer readable storage medium, and when the program is implemented, the steps in the method according to the above embodiments may be included. Wherein the storage medium may be a magnetic disk, optical disk, read-only memory (ROM), random access memory (RAM), or the like The technical characters of the above-described embodiments can be arbitrarily combined. In order to make the description simple, not all possible combinations of the technical characters in the above embodiments are described. However, as long as there is no contradiction in the combination of these technical characters, the combinations should be in the scope of the application.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A visitor authorization management method, comprising:
    obtaining an authorization object identifier and an authorization operation information corresponding to the authorization object identifier, and correspondingly caching the authorization operation information according to the authorization object identifier;
    retrieving a current latest authorization operation information corresponding to the authorization object identifier from a cache, and determining a reference time based on an authorization time in the current latest authorization operation information; and
    when a preset time period having the reference time as an end is reached, performing an authorization operation according to the current latest authorization operation information and the authorization object identifier;
    wherein the determining the reference time based on the authorization time in the current latest authorization operation information comprises:
        detecting whether the authorization object identifier has a valid-state authorization time; and
        adopting the authorization time in the current latest authorization operation information as the reference time when the authorization object identifier does not have the valid-state authorization time;
    wherein the detecting whether the authorization object identifier has the corresponding valid-state authorization time comprises:
        detecting whether the authorization operation information corresponding to the authorization object identifier has a success authorization flag;
        determining that the authorization object identifier does not have the corresponding valid-state authorization time if the authorization operation information does not have the success authorization flag;
        detecting whether the authorization operation information having the success authorization flag has expired;
        determining that the authorization object identifier does not have the corresponding valid-state authorization time if the authorization operation information having the success authorization flag has expired; and
        determining that the authorization object identifier has the corresponding valid-state authorization time if the authorization operation information having the success authorization flag has not expired.

2. The visitor authorization management method of claim 1, after the detecting whether the authorization object identifier has the valid-state authorization time, further comprising:
    when the authorization object identifier has the valid-state authorization time, obtaining the valid-state authorization time corresponding to the authorization object identifier; and
    when the authorization time in the current latest authorization operation information is earlier than the valid-state authorization time, adopting the authorization time in the current latest authorization operation information as the reference time.

3. The visitor authorization management method of claim 2 further comprising:
    adopting the valid-state authorization time as the reference time when the authorization time in the current latest authorization operation information is later than the valid-state authorization time.

4. A visitor authorization management apparatus, comprising a memory and a processor, the memory storing instructions; by executing the instructions, the processor being capable of performing:
    obtaining an authorization object identifier and an authorization operation information corresponding to the authorization object identifier, and correspondingly caching the authorization operation information according to the authorization object identifier;
    retrieving a current latest authorization operation information corresponding to the authorization object identifier from the cache module and determining a reference time based on an authorization time in the current latest authorization operation information; and
    performing an authorization operation according to the current latest authorization operation information and the authorization object identifier when a preset time period having the reference time as an end is reached;
    wherein the determining the reference time based on the authorization time in the current latest authorization operation information performed by the processor comprises:
        detecting whether the authorization object identifier has a valid-state authorization time; and
        adopting the authorization time in the current latest authorization operation information as the reference time when the authorization object identifier does not have the valid-state authorization time;
    wherein the detecting whether the authorization object identifier has the valid-state authorization time performed by the processor comprises:
        detecting whether the authorization operation information corresponding to the authorization object identifier has a success authorization flag;
        determining that the authorization object identifier does not have the valid-state authorization time if the authorization operation information does not have the success authorization flag;
        detecting whether the authorization operation information having the success authorization flag has expired;
        determining that the authorization object identifier does not have the valid-state authorization time if the authorization operation information having the success authorization flag has expired; and determining that the authorization object identifier has the valid-state authorization time if the authorization operation information having the success authorization flag has not expired.

5. The visitor authorization management apparatus of claim 4, wherein after the detecting whether the authorization object identifier has the valid-state authorization time, the processer further performs:

obtaining the valid-state authorization time when the authorization object identifier has the valid-state authorization time, and the reference time determination module is also configured to adopting the authorization time in the current latest authorization operation information as the reference time when the authorization time in the current latest authorization operation information is earlier than the valid-state authorization time.

6. The visitor authorization management apparatus of claim 5, wherein the processor further performs:

adopting the valid-state authorization time as the reference time when the authorization time in the current latest authorization operation information is later than the valid-state authorization time.

7. One or more non-volatile readable storage medium storing computer-executable instructions, by executing the instructions, one or more processors being capable of performing:

obtaining an authorization object identifier and an authorization operation information corresponding to the authorization object identifier, and correspondingly caching the authorization operation information according to the authorization object identifier;

retrieving a current latest authorization operation information corresponding to the authorization object identifier from a cache, and determining a reference time based on an authorization time in the current latest authorization operation information; and when a preset time period having the reference time as an end is reached, performing an authorization operation according to the current latest authorization operation information and the authorization object identifier;

wherein the determining the reference time based on the authorization time in the current latest authorization operation information performed by the processor comprises:

detecting whether the authorization object identifier has a valid-state authorization time; and adopting the authorization time in the current latest authorization operation information as the reference time when the authorization object identifier does not have the valid-state authorization time;

wherein the detecting whether the authorization object identifier has the valid-state authorization time performed by the processor comprises:

detecting whether the authorization operation information corresponding to the authorization object identifier has a success authorization flag;

determining that the authorization object identifier does not have the valid-state authorization time if the authorization operation information does not have the success authorization flag;

detecting whether the authorization operation information having the success authorization flag has expired;

determining that the authorization object identifier does not have the corresponding valid-state authorization time if the authorization operation information having the success authorization flag has expired; and determining that the authorization object identifier has the valid-state authorization time if the authorization operation information having the success authorization flag has not expired.

8. The one or more non-volatile readable storage medium of claim 7 being a memory of a server or a terminal.

9. The one or more non-volatile readable storage medium of claim 7, wherein after the detecting whether the authorization object identifier has the valid-state authorization time, the processor further performs:

when the authorization object identifier has the valid-state authorization time, obtaining the valid-state authorization time of the authorization object identifier; and when the authorization time in the current latest authorization operation information is earlier than the valid-state authorization time, adopting the authorization time in the current latest authorization operation information as the reference time.

10. The one or more non-volatile readable storage medium of claim 9, wherein the processor further performs:

adopting the valid-state authorization time as the reference time when the authorization time in the current latest authorization operation information is later than the valid-state authorization time.

* * * * *